Patented July 8, 1930

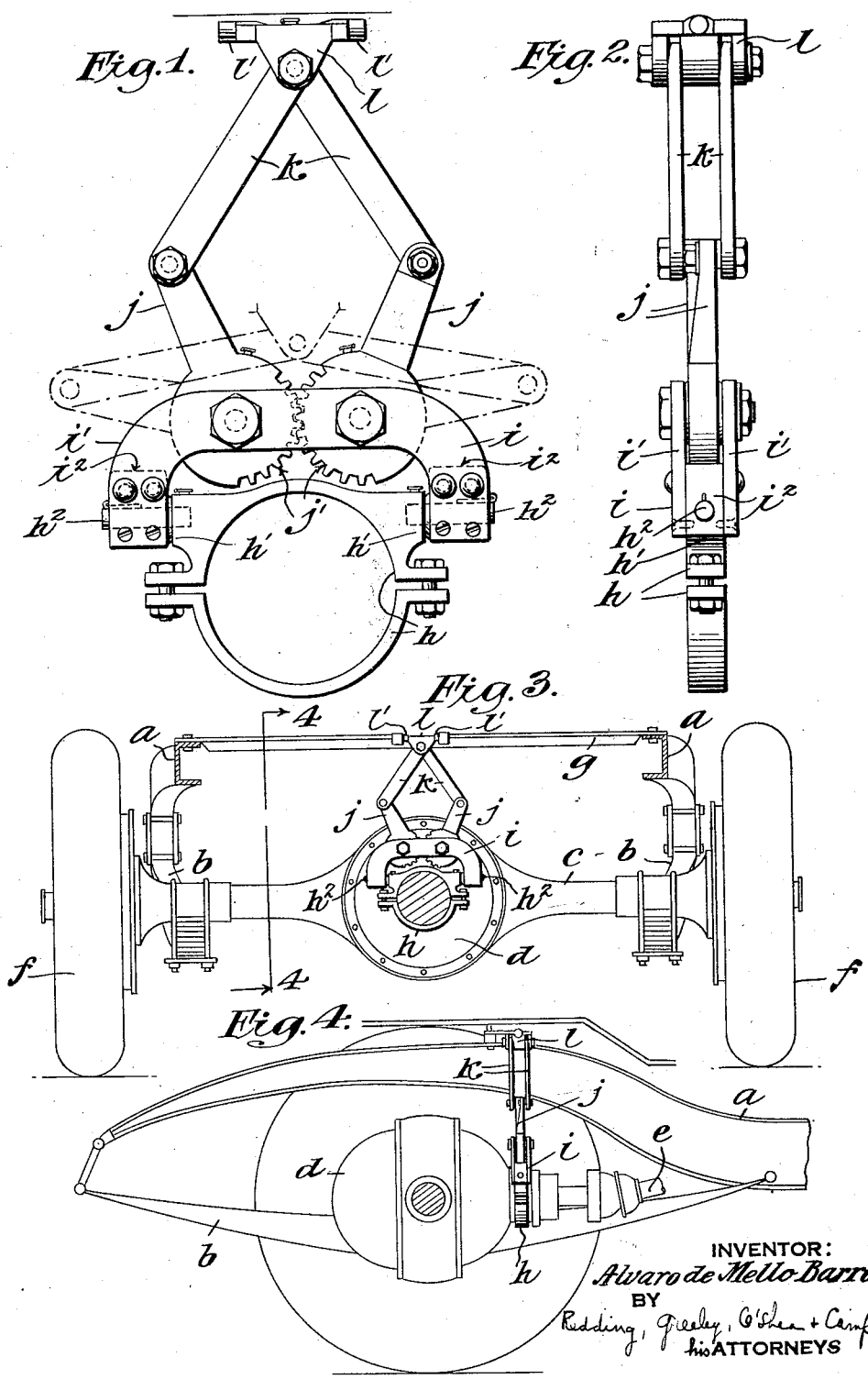

1,770,122

UNITED STATES PATENT OFFICE

ALVARO DE MELLO BARROS, OF SAO PAULO, BRAZIL

REENFORCING MECHANISM FOR MOTOR VEHICLES

Application filed August 24, 1928, Serial No. 301,910, and in Brazil October 3, 1927.

The present invention relates to auxiliary reenforcing mechanism for vehicle spring suspensions and has to do, particularly, with means for preventing lateral thrusts upon the springs due to side sway or transverse movement of the vehicle body with respect to the axles.

The capability of resisting side sway is one of the most important factors in spring design and the springs must have sufficient body to resist this disturbing force so common in vehicle operation. In this manner, a distinct limitation is placed upon the softness of operation of the springs since they must be designed, not only to receive vertical forces, but also lateral stresses incident to side sway.

Accordingly, an object of this invention is to provide a device which receives the stresses incident to side sway of the body with respect to the axles and prevents their application to the springs. At the same time, no resistance is offered to the vertical movement of the body with respect to the axles and the springs may thus be designed to accommodate the gravitational reactions of the body with the greatest amount of comfort to the passengers.

Further objects will appear as the description continues and reference will now be made to the accompanying drawings, wherein:

Figure 1 is a view in elevation, showing a device constructed in accordance with the present invention.

Figure 2 is a view in side elevation, of the device shown in Figure 1.

Figure 3 is a view, similar to Figure 1, showing the device applied to the rear axle of a vehicle.

Figure 4 is a view in section, taken on line 4—4 of Figure 3, and looking in the direction of the arrows.

Referring to the above drawings, $a$ designates the channel members of a vehicle frame mounted upon rear springs $b$ and axle $c$. A differential housing $d$ receives power from a propeller shaft $e$ and transmits the drive to wheels $f$ in a well known manner.

Extending between the frame members $a$, a transverse bracing member $g$ is provided. This bracing member serves as a support for the device to be described hereinafter and receives the stresses incident to the resistance of the mechanism to side sway of the frame. Bracket $h$ is clamped to the differential housing $d$ and carries bosses $h'$ to which stub shafts $h^2$ are pivoted. A U-shaped bracket $i$ is pivoted at its extremities upon the stub shafts $h^2$, the bracket being formed of spaced U members $i'$ mounted upon pivoted blocks $i^2$ which are carried by the stub shafts $h^2$.

Pivoted between the spaced members $i'$ are levers $j$ which are formed with gear segments $j'$. These levers are pivoted to the bracket $i$ in a manner to cause the teeth thereof to engage as clearly shown in Figure 1. Links $k$ connect the ends of levers $j$ with a bracket $l$ which is mounted upon the bracing member $g$. The bracket $l$ is pivoted upon the bracing member $g$ through oppositely extending arms $l'$ which are journaled in the bracing member.

It will be seen that vertical movement of the bracket $l$ with respect to the differential housing and bracket $h$ will be permitted by rotation of the gear segments $j'$, the teeth of each engaging to permit such movement. The lines in Figure 1 represent the position of levers $j$ and links $k$ after a degree of vertical movement has taken place. However, when there is a tendency for bracket $l$ to be displaced laterally with respect to the differential housing and bracket $h$, one of the segments $j'$, will receive forces tending to turn it in one direction at the point where the teeth engage those of the other segment, while the other segment $j'$ will receive forces tending to turn it in the opposite direction. Since the teeth of each segment mesh, this movement cannot take place and the tendency for lateral displacement or side sway is successfully resisted.

By means of the pivot connections between the brackets and frame members, universal movement between the connecting device and frame is accommodated thus permitting rocking and other movements which are necessary to the ease of riding while effectively resisting and preventing side sway of the body.

Although the invention has been described in connection with the accompanying drawings, it is not to be limited, save as defined in the appended claims.

I claim as my invention:

1. A device of the character described comprising a bracket carried by a vehicle axle, a second bracket carried by the vehicle body, interengaging gears pivoted on the first bracket, and means to operatively connect the gears to the second bracket on a common axis.

2. A device of the character described comprising a bracket carried by a vehicle axle, a second bracket carried by the vehicle body, interengaging gears pivoted on the first bracket, lever arms formed on the gears, links pivoted to the arms and means to operatively connect the links to the second bracket on a common axis, said axis lying in a perpendicular plane passing through the pitch circles of the gears at their point of contact.

3. A device of the character described comprising a bracket carried by a vehicle axle, a second bracket carried by the vehicle body, interengaging gears pivoted on the first bracket, lever arms formed on the gears, links pivoted to the arms and means to operatively connect the links to the second bracket on a common axis, said axis lying in a plane tangent to the pitch circles of the gears at their point of contact.

4. A device of the character described comprising a bracket carried by a vehicle axle, said bracket including spaced members, levers pivoted between the members, interengaging gear segments on the levers, links pivoted to the levers at their extremities, and means to operatively pivot the ends of the links on a common axis.

5. A device of the character described comprising a bracket, means to pivot the bracket to a vehicle axle, said bracket including spaced members, levers pivoted between the members, interengaging gear segments on the levers, links pivoted to the levers at their extremities, and means to pivot the ends of the links on a common axis.

6. In a vehicle having an axle member and a frame member sprung thereon, means operatively interposed between axle and frame members to prevent lateral movement but permit vertical movement between the members, said means comprising interengaging gears carried by one of the members and connections between the respective gears and a single point on the other member.

7. In a vehicle having an axle member and a frame member sprung thereon, means operatively interposed between axle and frame members to prevent lateral movement but permit vertical movement between the members, said means comprising interengaging gears carried by one of the members, lever arms carried rigidly by the respective gears, links pivotally connected to the respective arms, and means to connect the links to the other member on a common axis.

This specification signed this 1st day of August, A. D. 1928.

ALVARO DE MELLO BARROS.